(12) United States Patent
Rayl

(10) Patent No.: US 8,983,753 B2
(45) Date of Patent: Mar. 17, 2015

(54) COMBUSTION SETPOINT CONTROL SYSTEMS AND METHODS

(75) Inventor: Allen B. Rayl, Waterford, MI (US)

(73) Assignee: GM Global Technology Operations LLC, Detroit, MI (US)

(*) Notice: Subject to any disclaimer, the term of this patent is extended or adjusted under 35 U.S.C. 154(b) by 877 days.

(21) Appl. No.: 13/097,467

(22) Filed: Apr. 29, 2011

(65) Prior Publication Data

US 2012/0277972 A1 Nov. 1, 2012

(51) Int. Cl.
| | |
|---|---|
| *G06F 19/00* | (2011.01) |
| *F02D 37/02* | (2006.01) |
| *F02D 37/00* | (2006.01) |
| *F02D 41/00* | (2006.01) |

(52) U.S. Cl.
CPC ............... *F02D 37/02* (2013.01); *F02D 37/00* (2013.01); *F02D 41/0002* (2013.01); *Y02T 10/42* (2013.01)
USPC ...................................................... 701/102

(58) Field of Classification Search
CPC ............ F02D 2041/001; F02D 13/023; F02D 41/005; F02D 13/0207; F02D 13/0253; F02D 13/0203
USPC ............ 701/101–105, 84; 123/435, 672, 674, 123/480, 568.21; 60/295, 301, 285, 286
See application file for complete search history.

(56) References Cited

U.S. PATENT DOCUMENTS

| | | | |
|---|---|---|---|
| 4,466,405 A | 8/1984 | Hattori et al. | |
| 5,749,334 A | 5/1998 | Oda et al. | |
| 6,101,998 A | 8/2000 | Tamura et al. | |
| 6,681,739 B2 * | 1/2004 | Mamiya et al. | 123/295 |
| 6,684,151 B1 | 1/2004 | Ring | |
| 6,792,924 B2 * | 9/2004 | Aoyama et al. | 123/568.14 |
| 6,971,350 B2 * | 12/2005 | Akasaka et al. | 123/90.16 |
| 7,024,304 B2 * | 4/2006 | Fukasawa et al. | 701/111 |
| 7,124,020 B2 | 10/2006 | Vermonet et al. | |
| 7,761,223 B2 | 7/2010 | Wang et al. | |
| 7,848,910 B2 | 12/2010 | Schantl et al. | |
| 8,033,267 B2 | 10/2011 | Nakagawa et al. | |
| 8,600,644 B2 | 12/2013 | Verner et al. | |
| 2005/0022789 A1 | 2/2005 | Palma et al. | |
| 2006/0293829 A1 | 12/2006 | Cornwell et al. | |
| 2007/0288213 A1 | 12/2007 | Schantl et al. | |
| 2011/0303190 A1 | 12/2011 | Yasuda | |
| 2012/0277970 A1 | 11/2012 | Rayl | |

FOREIGN PATENT DOCUMENTS

CN 1181800 A 5/1998

OTHER PUBLICATIONS

U.S. Appl. No. 13/094,273, filed Apr. 26, 2011, Rayl.
U.S. Appl. No. 13/113,496, filed May 23, 2011, Verner.

\* cited by examiner

*Primary Examiner* — Thomas Moulis
*Assistant Examiner* — Joseph Dallo

(57) ABSTRACT

A system for a vehicle, includes first, second, and third setpoint generation modules, a scaling module, and an actuator control module. The first setpoint generation module generates a first target value for an combustion parameter of an engine based on a predetermined value of a combustion stability of the engine. The second setpoint generation module generates a second target value for the combustion parameter based on a predetermined fuel efficiency. The scaling module generates a scaled value for the combustion parameter based on the first and second target values and a scalar value. The third setpoint generation module generates a third target value for the combustion parameter based on the first target value and the scaled value. The actuator control module controls at least one engine actuator associated with the combustion parameter based on the third target value.

20 Claims, 3 Drawing Sheets

US 8,983,753 B2

COMBUSTION SETPOINT CONTROL SYSTEMS AND METHODS

FIELD

The present disclosure relates to internal combustion engines and more particularly to engine actuator control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Air is drawn into an engine through an intake manifold. A throttle valve controls airflow into the engine. The air mixes with fuel from one or more fuel injectors to form an air/fuel mixture. The air/fuel mixture is combusted within one or more cylinders of the engine. Combustion of the air/fuel mixture may be initiated by, for example, injection of the fuel or spark provided by a spark plug.

Combustion of the air/fuel mixture produces torque and exhaust gas. Torque is generated via heat release and expansion during combustion of the air/fuel mixture. The engine transfers torque to a transmission via a crankshaft, and the transmission transfers torque to one or more wheels via a driveline. The exhaust gas is expelled from the cylinders to an exhaust system.

An engine control module (ECM) controls the torque output of the engine. The ECM may control the torque output of the engine based on driver inputs and/or other inputs. The driver inputs may include, for example, accelerator pedal position, brake pedal position, and/or one or more other suitable driver inputs. The other inputs may include, for example, cylinder pressure measured using a cylinder pressure sensor, one or more variables determined based on the measured cylinder pressure, and/or one or more other suitable values.

SUMMARY

A system for a vehicle, includes first, second, and third setpoint generation modules, a scaling module, and an actuator control module. The first setpoint generation module generates a first target value for an combustion parameter of an engine based on a predetermined value of a combustion stability of the engine. The second setpoint generation module generates a second target value for the combustion parameter based on a predetermined fuel efficiency. The scaling module generates a scaled value for the combustion parameter based on the first and second target values and a scalar value. The third setpoint generation module generates a third target value for the combustion parameter based on the first target value and the scaled value. The actuator control module controls at least one engine actuator associated with the combustion parameter based on the third target value.

A method for a vehicle, includes: generating a first target value for an combustion parameter of an engine based on a predetermined value of a combustion stability of the engine; generating a second target value for the combustion parameter based on a predetermined fuel efficiency; generating a scaled value for the combustion parameter based on the first and second target values and a scalar value; generating a third target value for the combustion parameter based on the first target value and the scaled value; and controlling at least one engine actuator associated with the combustion parameter based on the third target value.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
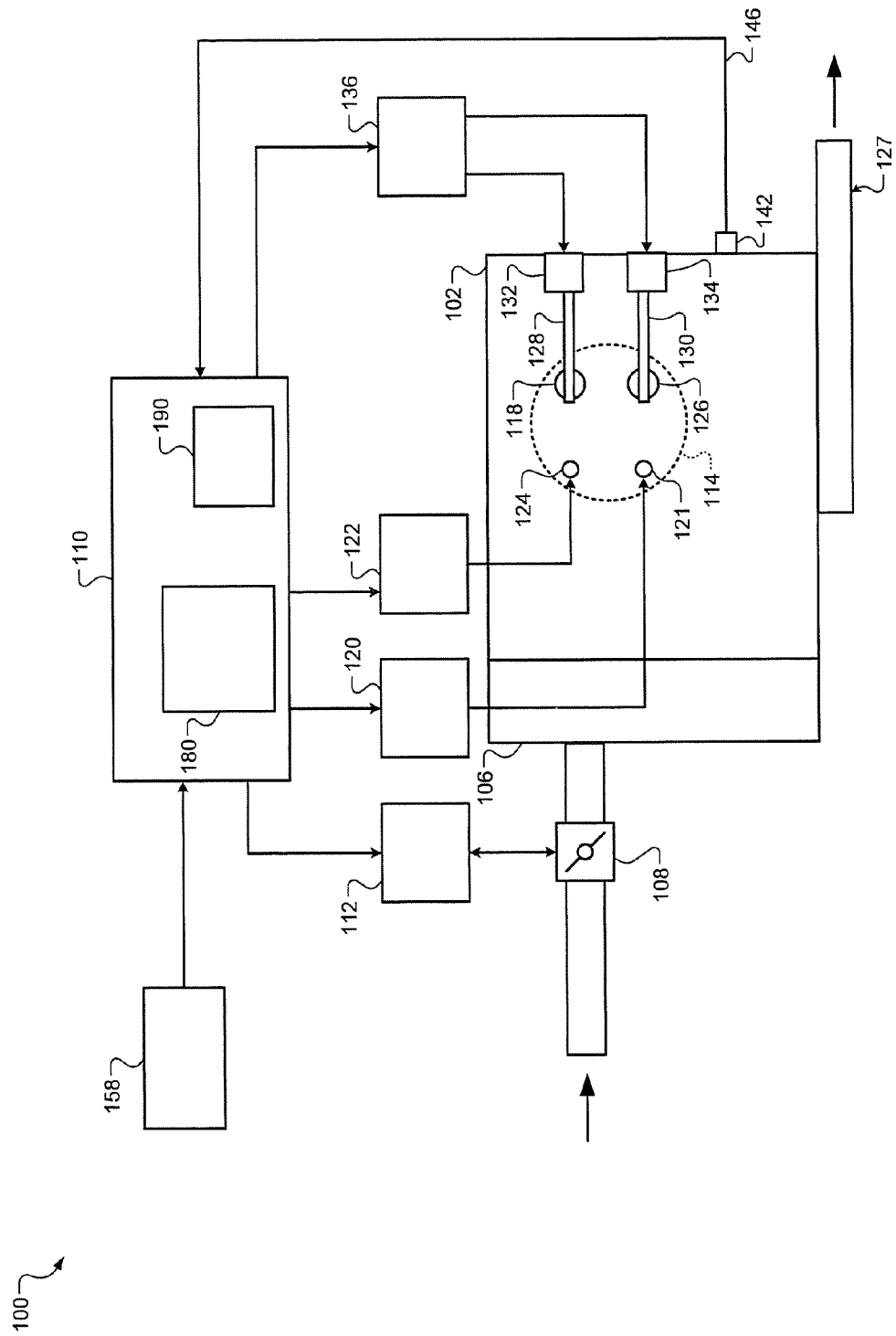
FIG. 1 is a functional block diagram of an example engine system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

An engine control module (ECM) controls engine actuators based on a set of combustion setpoints or target values.

Example combustion setpoints include, but are not limited to, amount and timing of fuel injection for a combustion event, spark timing for the combustion event, air to fuel ratio for the combustion event, amounts of oxygen and exhaust gas within an intake manifold, intake manifold pressure, cam phaser position(s), and throttle opening.

The ECM may generate the set of setpoints at a given time using a first predetermined relationship or a second predetermined relationship. The first predetermined relationship (e.g., function or mapping) is calibrated based a desired level of combustion stability. The second predetermined relationship (e.g., function or mapping) is calibrated based on a desired level of fuel efficiency. The ECM may select which one of the predetermined relationships to use, for example, based on input from a user.

The ECM of the present disclosure generates two sets of setpoints at a given time: a first set of setpoints generated using the first predetermined relationship and a second set of setpoints generated using the second predetermined relationship. The ECM generates a set with differences between the setpoints of the first and second sets, respectively, and scales the differences. The ECM selectively adjusts one or more of the setpoints of the first set based on the scaled differences, respectively, to produce a final set of setpoints.

The final set of setpoints provides a balance between the desired level of combustion stability and the desired level of fuel efficiency. More specifically, the final set may provide combustion that is less stable relative to the first set but more stable relative to the second set. Additionally, the final set will provide an increase in fuel efficiency relative to the first set and a decrease in fuel efficiency relative to the second set. The ECM controls the engine actuators based on the setpoints of the final set.

Referring now to FIG. 1, a functional block diagram of an example engine system 100 is presented. The engine system 100 includes an engine 102 that combusts an air/fuel mixture to produce drive torque for a vehicle. While the engine 102 will be discussed as a spark ignition direct injection (SIDI) engine, the engine 102 may include another suitable type of engine, such as a homogenous charge compression ignition (HCCI) engine. One or more electric motors and/or motor generator units (MGUs) may be used with the engine 102.

Air is drawn into an intake manifold 106 through a throttle valve 108. The throttle valve 108 varies airflow into the intake manifold 106. For example only, the throttle valve 108 may include a butterfly valve having a rotatable blade. An engine control module (ECM) 110 controls a throttle actuator module 112 (e.g., an electronic throttle controller or ETC), and the throttle actuator module 112 controls opening of the throttle valve 108.

Air from the intake manifold 106 is drawn into cylinders of the engine 102. While the engine 102 may include more than one cylinder, only a single representative cylinder 114 is shown. Air from the intake manifold 106 is drawn into the cylinder 114 through one or more intake valves, such as intake valve 118.

The ECM 110 controls a fuel actuator module 120, and the fuel actuator module 120 controls opening of a fuel injector 121. The fuel injector 121 injects fuel into the cylinder 114. Fuel is provided to the fuel injector 121 by a low pressure fuel pump and a high pressure fuel pump (not shown). The low pressure fuel pump draws fuel from a fuel tank and provides fuel at low pressures to the high pressure fuel pump. The high pressure fuel pump selectively further pressurizes the fuel, for example, for direct injection into the cylinders of the engine 102.

The injected fuel mixes with air and creates an air/fuel mixture in the cylinder 114. A piston (not shown) within the cylinder 114 compresses the air/fuel mixture. Based upon a signal from the ECM 110, a spark actuator module 122 energizes a spark plug 124 in the cylinder 114. Spark generated by the spark plug 124 ignites the air/fuel mixture. The timing of the spark may be specified relative to the time when the piston is at its topmost position, referred to as top dead center (TDC). In various types of engines, such as diesel engines, the spark plug 124 and the spark actuator module 122 may be omitted.

The combustion of the air/fuel mixture drives the piston down, and the piston drives rotation of a crankshaft (not shown). After reaching a bottom most position, referred to as bottom dead center (BDC), the piston begins moving up again and expels the byproducts of combustion through one or more exhaust valves, such as exhaust valve 126. The byproducts of combustion are exhausted from the vehicle via an exhaust system 127.

One combustion cycle, from the standpoint of the cylinder 114, may include two revolutions of the crankshaft (i.e., 720° of crankshaft rotation) in various implementations. One combustion cycle for the cylinder 114 may include four phases: an intake phase; a compression phase; an expansion phase; and an exhaust phase. For example only, the piston lowers toward the BDC position and air is drawn into the cylinder 114 during the intake phase. The piston rises toward the TDC position and compresses the contents of the cylinder 114 during the compression phase. Fuel may be injected into the cylinder 114 during the compression phase. Fuel injection may also occur during the expansion phase. Combustion drives the piston toward the BDC position during the expansion phase. The piston rises toward the TDC position to expel the resulting exhaust gas from the cylinder 114 during the exhaust phase. One engine cycle may refer to the period associated with each of the cylinders undergoing one complete combustion cycle.

The intake valve 118 may be controlled by an intake camshaft 128, while the exhaust valve 126 may be controlled by an exhaust camshaft 130. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The time at which the intake valve 118 is opened may be varied with respect to the TDC position by an intake cam phaser 132. The time at which the exhaust valve 126 is opened may be varied with respect to the TDC position by an exhaust cam phaser 134. A phaser actuator module 136 may control the intake and exhaust cam phasers 132 and 134 based on signals from the ECM 110. Fuel injection timing may also be specified relative to the position of the piston.

A crankshaft position sensor 142 monitors rotation of the crankshaft and generates a crankshaft position signal 146 based on the rotation of the crankshaft. For example only, the crankshaft position sensor 142 may include a variable reluctance (VR) sensor or another suitable type of crankshaft position sensor. The crankshaft position signal 146 may include a pulse train. An N-toothed wheel (not shown) rotates with the crankshaft. A pulse may be generated in the crankshaft position signal 146 as a tooth of the N-toothed wheel passes the crankshaft position sensor 142. Accordingly, each pulse corresponds to an angular rotation of the crankshaft by an amount approximately equal to 360° divided by N teeth. The N-toothed wheel may also include a gap of one or more missing teeth, and the gap may be used as an indicator of one complete revolution of the crankshaft (i.e., 360° of crankshaft rotation).

One or more other sensors 158 may also be provided. For example, the other sensors 158 may include a mass air flowrate (MAF) sensor, a manifold absolute pressure (MAP) sensor, an intake air temperature (IAT) sensor, a coolant temperature sensor, an oil temperature sensor, one or more camshaft position sensors, one or more cylinder pressure sensors, and/or one or more other suitable sensors.

The ECM 110 includes a setpoint generation module 180 that generates a first set of setpoints for controlling engine actuators to achieve a desired combustion stability under the operating conditions. The setpoint generation module 180 also generates a second set of setpoints for controlling the engine actuators to achieve a desired fuel efficiency under the operating conditions. Controlling the engine actuators based on the first set of setpoints may provide more stable combustion relative to the second set of setpoints. Controlling the engine actuators based on the second set of setpoints may provide an increase in fuel efficiency relative to the first set of setpoints.

The setpoint generation module 180 determines a set of differences between setpoints of the first and second sets, respectively. The setpoint generation module 180 selectively scales the differences and selectively adjusts one or more of the setpoints of the first set of setpoints based on the scaled differences, respectively. The selectively adjusted set of setpoints will be referred to as a final setpoint set, and the final setpoint set may provide a balance between the desired combustion stability and the desired fuel efficiency.

An actuator control module 190 may control the engine actuators based on the final set of setpoints. For example only, the actuator control module 190 may control fuel injection (e.g., timing, amount, number of injections, amount of each injection, etc.), throttle opening, spark timing, intake and/or exhaust valve lift and/or duration, boost of a boost device (e.g., a turbocharger), exhaust gas recirculation (EGR) opening, and/or one or more other suitable engine actuators based on the fourth set of setpoints.

Figure 2:
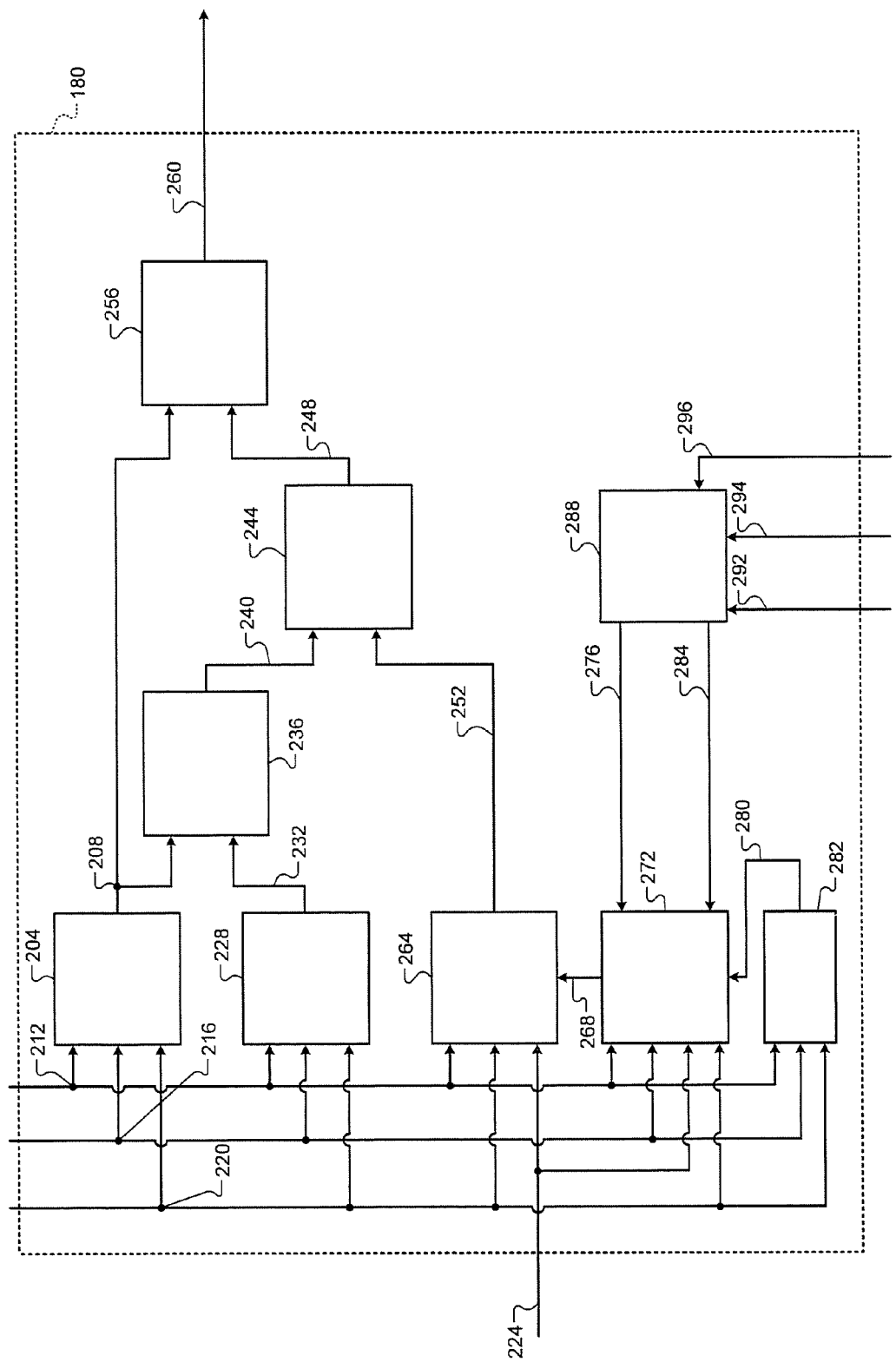
FIG. 2 is a functional block diagram of an example setpoint set generation module according to the present disclosure.

Referring now to FIG. 2, a functional block diagram of an example implementation of the setpoint generation module 180 is presented. A first setpoint set generation module 204 generates a first set of setpoints (first setpoint set) 208 based on an engine speed 212, an engine temperature 216, and an engine load 220 to achieve a desired (e.g., best) value of a combustion stability 224 under the operating conditions. For example only, the first setpoint set generation module 204 may generate the first setpoint set 208 using a function or a mapping that relates the engine speed 212, the engine temperature 216, and the engine load 220 to the setpoints of the first setpoint set 208.

Each set of setpoints, such as the first setpoint set 208, includes one or more target (or setpoint) values for one or more combustion parameters, respectively, for a next combustion event of the cylinder 114. For example only, a set of setpoints may include a first mass of fuel to inject, a first time (e.g., crankshaft angle) to begin injecting the first mass of fuel, a second mass of fuel to inject, a second time to begin injecting the second mass of fuel, and a ratio for splitting an amount of fuel into multiple pulses. The set of setpoints may additionally or alternatively include third and fourth times at which the spark plug 124 should be energized, an air fuel ratio, a ratio of oxygen to recirculated exhaust gas within the intake manifold 106, and/or intake and/or exhaust camshaft phaser angles. The set of setpoints may additionally or alternatively include intake manifold pressure or intake manifold vacuum, a crankshaft angle (CA) at which 50 percent of injected fuel should be burned within the cylinder 114 (referred to as CA50), and/or one or more other target values for one or more other combustion parameters, respectively.

The engine speed 212 may be generated, for example, based on the crankshaft position signal 146 generated by the crankshaft position sensor 142. For example only, the engine speed 212 may be generated based on a period between the rising edges of two pulses in the crankshaft position signal 146 and a rotational distance between the rising edges of the two pulses where the rising edges are separated by at least 90 degrees (of crankshaft rotation). The engine temperature 216 may be generated, for example, based on engine coolant temperature, engine oil temperature, an air temperature (e.g., ambient or IAT), and/or one or more other suitable temperatures. The engine load 220 may be generated, for example, based on one or more engine airflow parameters, such as a ratio of the MAF to a maximum MAF. Additionally or alternatively, the engine load 220 may be generated, for example, based on one or more engine torque parameters, such as a brake torque, a net torque, and/or an indicated torque. Additionally or alternatively, the engine load 220 may be generated, for example, based on one or more engine effective pressure parameters, such as a brake mean effective pressure (BMEP), a net mean effective pressure (NMEP), and/or an indicated mean effective pressure (IMEP). The combustion stability 224 may be generated, for example, based on an IMEP parameter, such as a coefficient of variation (COV) of IMEP, a change in IMEP, or another suitable value indicative of combustion stability.

A second setpoint set generation module 228 generates a second set of setpoints (second setpoint set) 232 based on the engine speed 212, the engine temperature 216, and the engine load 220 to achieve a desired (e.g., best) fuel efficiency for the operating conditions. For example only, the second setpoint set generation module 228 may generate the second setpoint set 232 using a function or a mapping that relates the engine speed 212, the engine temperature 216, and the engine load 220 to the setpoints of the second setpoint set 232. The second setpoint set 232 includes one or more target values for the one or more combustion parameters, respectively, for which target values are also included in the first setpoint set 208. In this manner, the first and second setpoint sets 208 and 232 each include a target value for each of the given combustion parameters. One or more of the target values in the second setpoint set 232 may be different than the corresponding target values in the first setpoint set 208.

Each set of setpoints (e.g., the first setpoint set 208 and the second setpoint set 232) may be embodied as a vector matrix (i.e., a matrix with only 1 row or column) in various implementations. An example vector matrix illustrating a set of setpoints, such as the first setpoint set 208 or the second setpoint set 232, is provided below Parameter 1 Setpoint Parameter 2 Setpoint

...

Parameter $N$ Setpoint where Parameter N Setpoint is the target value for the N-th combustion parameter in the vector matrix and N is an integer greater than zero.

A difference determination module 236 generates a set of differences (difference set) 240 based on the first and second setpoint sets 208 and 232. More specifically, the difference determination module 236 generates the difference set 240 based on differences between the corresponding target values of the first and second setpoint sets 208 and 232, respectively. For example only, the difference determination module 236 may set the difference set 240 equal to the first setpoint set 208 (in matrix form) minus the second setpoint set 232 (in matrix form). An example vector matrix illustrating the entries of the difference set 240 and how the entries of difference set 240 may be calculated is provided below.

$$\text{Parameter 1 Setpoint from First Setpoint Set} - $$
$$\text{Parameter 1 Setpoint from Second Setpoint Set}$$
$$\text{Parameter 2 Setpoint from First Setpoint Set} - $$
$$\text{Parameter 2 Setpoint from Second Setpoint Set}$$
$$\ldots$$
$$\text{Parameter } N \text{ Setpoint from First Setpoint Set} - $$
$$\text{Parameter } N \text{ Setpoint from Second Setpoint Set}$$

A scaling module 244 generates a scaled set of differences (scaled difference set) 248 based on the difference set 240 and a setpoint scalar 252. For example only, the scaling module 244 may set the scaled setpoint set 248 equal to the product of the difference set 240 (in matrix form) and the setpoint scalar 252 (e.g., a 1×1 matrix). An example vector matrix illustrating the entries of the scaled difference set 248 and how the entries of the scaled difference set 248 may be calculated is provided below.

$$\text{Scalar} * (\text{Parameter 1 Setpoint from First Setpoint Set} - \text{Parameter 1 Setpoint from Second Setpoint Set})$$
$$\text{Scalar} * (\text{Parameter 2 Setpoint from First Setpoint Set} - \text{Parameter 2 Setpoint from Second Setpoint Set})$$
$$\ldots$$
$$\text{Scalar} * (\text{Parameter } N \text{ Setpoint from First Setpoint Set} - \text{Parameter } N \text{ Setpoint from Second Setpoint Set})$$

where Scalar is the setpoint scalar 252. The setpoint scalar 252 is discussed in further detail below.

A final setpoint set generation module 256 generates a final setpoint set 260 based on the first setpoint set 208 and the scaled difference set 248. More specifically, the final setpoint set generation module 256 generates the final setpoint set 260 based on differences between the corresponding target values of the first setpoint set 208 and the scaled difference set 248, respectively. For example only, the final setpoint set generation module 256 may set the final setpoint set 260 equal to the first setpoint set 208 (in matrix form) minus the scaled difference set 248 (in matrix form). An example vector matrix illustrating the entries of the final setpoint set 260 and how the entries of the final setpoint set 260 may be calculated is provided below.

$$\text{Parameter 1 from First Setpoint Set} - \text{Scalar} * (\text{Parameter 1 Setpoint from First Setpoint Set} - \text{Parameter 1 Setpoint from Second Setpoint Set})$$
$$\text{Parameter 2 from First Setpoint Set} - \text{Scalar} * (\text{Parameter 2 Setpoint from First Setpoint Set} - \text{Parameter 2 Setpoint from Second Setpoint Set})$$
$$\ldots$$
$$\text{Parameter } N \text{ from First Setpoint Set} - \text{Scalar} * (\text{Parameter } N \text{ Setpoint from First Setpoint Set} - \text{Parameter } N \text{ Setpoint from Second Setpoint Set}) - \text{Parameter } N \text{ from First Setpoint Set}$$

The actuator control module 190 controls the engine actuators based on the final setpoint set 260. For example only, the actuator control module 190 may control the fuel actuator module 120 based on one or more setpoints of the final setpoint set 260. For another example only, the actuator control module 190 may control the spark actuator module 122 and/or the throttle actuator module 112 based on one or more setpoints of the final setpoint set 260. In various implementations, one or more offsets, scalars, and/or other adjustments may be applied to one or more of the setpoints of the final setpoint set 260 before use by the actuator control module 190.

A setpoint scalar generation module 264 generates the setpoint scalar 252 based on the engine speed 212, the engine load 220, and the combustion stability 224. The scaling module 244 generates the setpoint scalar 252 further based on a learned scalar 268. For example only, the setpoint scalar generation module 264 may generate the setpoint scalar 252 using a function or a mapping that relates the engine speed 212, the engine load 220, the combustion stability 224, and the learned scalar 268.

A scalar learning module 272 generates the learned scalar 268. The scalar learning module 272 may set the learned scalar 268 to a predetermined value when an ignition system is turned on. The predetermined value may be set based on the desired value of the combustion stability 224 or another suitable value of the combustion stability 224.

When a learn signal 276 is in an active state, the scalar learning module 272 may selectively adjust (i.e., increase and/or decrease) the learned scalar 268 based on the engine speed 212, the engine temperature 216, the engine load 220, and/or the combustion stability 224. For example only, the scalar learning module 272 may adjust the learned scalar 268 based on the engine speed 212, the engine temperature 216, the engine load 220, and/or the combustion stability 224 to increase the fuel efficiency. The scalar learning module 272 may begin adjusting the learned scalar 268 from the predetermined value when the learn signal 276 is transitioned from an inactive state to the active state. The scalar learning module 272 may limit the learned scalar 268 to a scalar limit value 280.

A limit generation module 282 may generate the scalar limit value 280 based on the engine speed 212, the engine temperature 216, and/or the engine load 220. For example only, the limit generation module 282 may generate the scalar limit value 280 using a function or a mapping that relates the engine speed 212, the engine temperature 216, and the engine load 220 to the scalar limit value 280. The scalar limit value

280 may be based on the desired value of the combustion stability 224 or another suitable value of the combustion stability 224.

When an unlearn signal 284 is in an active state, the scalar learning module 272 may adjust the learned scalar 268 toward the predetermined value. The scalar learning module 272 may adjust the learned scalar 268 toward the predetermined value at a predetermined rate when the unlearn signal 284 is in the active state. After reaching the predetermined value, the scalar learning module 272 may maintain the learned scalar 268 at the predetermined value until the unlearn signal 284 is in the inactive state and the learn signal 276 is in the active state.

A triggering module 288 may generate the learn signal 276 and the unlearn signal 284. The triggering module 288 may generate the learn signal 276 and the unlearn signal 284 based on an engine runtime period 292, an engine run condition 294, and an engine run condition period 296. The engine runtime period 292 may indicate how long (i.e., the period) the engine 102 has been running since a last engine startup event or when the ignition system was last turned on. The engine run condition 294 may include, for example, a changing running condition, a wide open throttle (WOT) running condition, a steady-state (SS) cruising running condition, an idle running condition, and/or one or more other suitable engine running conditions. The engine run condition period 296 may indicate how long (i.e., the period) the engine run condition 294 has been the same.

For example only, the triggering module 288 may selectively set the unlearn signal 284 to the active state when the engine run condition 294 is a predetermined engine run condition and the engine runtime period 292 is greater than a predetermined period. The predetermined engine run condition may be, for example, the WOT running condition. The engine 102 running at the WOT running condition for the predetermined period may clear deposits from the engine 102. Thus, the scalar learning module 272 may return the learned scalar 268 to the predetermined value for relearning. For another example only, the triggering module 288 may selectively set the learn signal 276 to the active state when the engine run condition 294 is the SS cruising running condition or the idle condition for a predetermined period.

Figure 3:
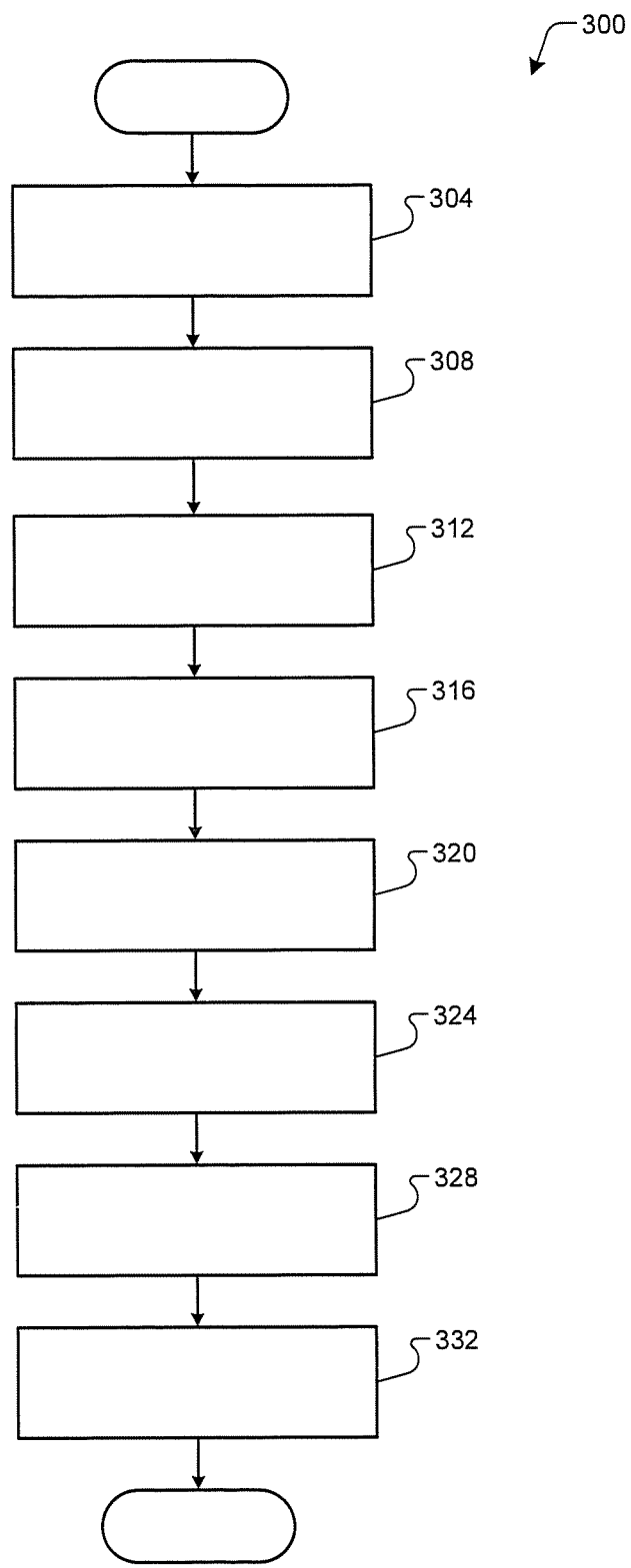
FIG. 3 is a functional block diagram of an example method of controlling engine actuators according to the present disclosure.

Referring now to FIG. 3, a flowchart 300 depicting an example method of controlling engine actuators is presented. Control may begin with 304 where control generates the first and second setpoint sets 208 and 232. The first and second setpoint sets 208 and 232 include corresponding target values for the combustion parameters, respectively. Control generates the first and second setpoint sets 208 and 232 based on the engine speed 212, the engine temperature 216, and the engine load 220. For example only, control may generate the first setpoint set 208 using a first function or mapping that relates the engine speed 212, the engine temperature 216, and the engine load 220 to the first setpoint set 208. Control may generate the second setpoint set 232 using a second, different, function or mapping that relates the engine speed 212, the engine temperature 216, and the engine load 220 to the second setpoint set 232. The first function or mapping may be calibrated based on the desired value of the combustion stability 224, while the second function or mapping may be calibrated based on the desired value of the fuel efficiency.

At 308, control generates the difference set 240 based on differences between the corresponding target values of the first and second setpoint sets 208 and 232, respectively. For example only, control may set the difference set 240 (in matrix form) equal to the first setpoint set 208 (in matrix form) minus the second setpoint set 232 (in matrix form). Control generates the scalar limit value 280 at 312. Control may generate the scalar limit value 280 using a function or a mapping that relates the engine speed 212, the engine temperature 216, and the engine load 220 to the scalar limit value 280.

At 316, control generates the learned scalar 268. Control may selectively initialize the learned scalar 268 to the predetermined value, which may be set based on the desired level of the combustion stability 224. Control may selectively adjust the learned scalar 268 during engine operation based on the combustion stability 224, the engine speed 212, the engine temperature 216, and/or the engine load 220. Control limits the learned scalar 268 to the scalar limit value 280.

Control generates the setpoint scalar 252 at 320 based on the combustion stability 224, the engine speed 212, the engine load 220, and the learned scalar 268. Control generates the scaled difference set 248 at 324 based on the setpoint scalar 252 and the difference set 240. For example only, control may set the scaled difference set 248 (in matrix form) to the product of the difference set 240 (in matrix form) and the setpoint scalar 252.

At 328, control generates the final setpoint set 260. Control generates the final setpoint set 260 based on the first setpoint set 208 and the scaled difference set 248. For example only, control may set the final setpoint set 260 (in matrix form) based on the first setpoint set 208 (in matrix form) minus the scaled difference set 248 (in matrix form). Control may set one or more of the target values of the final setpoint set 260 equal to the corresponding target values of the first setpoint set 208 such that the target values of the first setpoint set 208 are not adjusted by the corresponding value of the scaled difference set 248. Control selectively controls the engine actuators based on the final setpoint set 260 at 332.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a vehicle, comprising:
a first setpoint generation module that generates a first target value for a combustion parameter of an engine using a first relationship,
wherein the first relationship is calibrated based on a predetermined value of a combustion stability of the engine;
a second setpoint generation module that generates a second target value for the combustion parameter using a second relationship,
wherein the second relationship is calibrated based on a predetermined fuel efficiency;
a scaling module that generates a scaled value for the combustion parameter based on the first and second target values and a scalar value;
a third setpoint generation module that generates a third target value for the combustion parameter based on the first target value and the scaled value; and
an actuator control module that controls at least one engine actuator associated with the combustion parameter based on the third target value.

2. The system of claim 1 wherein the first and second setpoint generation modules generate the first and second target values, respectively, based on an engine speed, an engine load, and an engine temperature.

3. The system of claim 1 further comprising a difference determination module that determines a difference between the first target value and the second target value, wherein the scaling module sets the scaled value equal to a product of the difference and the scalar value.

4. The system of claim 3 wherein the difference determination module sets the difference equal to the first target value minus the second target value.

5. The system of claim 1 wherein the third setpoint generation module sets the third target value equal to the first target value minus the scaled value.

6. The system of claim 1 further comprising a setpoint scalar generation module that generates the scalar value based on the predetermined value of the combustion stability.

7. The system of claim 6 wherein the setpoint scalar generation module generates the scalar value further based on an engine speed and an engine load.

8. The system of claim 6 wherein the setpoint scalar generation module generates the scalar value further based on a learned scalar value.

9. The system of claim 8 further comprising a scalar learning module that selectively initializes the learned scalar value to a predetermined value and that selectively adjusts the learned scalar value during engine operation based on an engine speed, an engine load, an engine temperature, and the combustions stability.

10. The system of claim 9 further comprising a limit generation module that generates a scalar limit value based on the engine speed, the engine load, and the engine temperature, wherein the scalar learning module limits the learned scalar value to the scalar limit value.

11. A method for a vehicle, comprising:
generating a first target value for an combustion parameter of an engine using a first relationship,
wherein the first relationship is calibrated based on a predetermined value of a combustion stability of the engine;
generating a second target value for the combustion parameter using a second relationship,
wherein the second relationship is calibrated based on a predetermined fuel efficiency;
generating a scaled value for the combustion parameter based on the first and second target values and a scalar value;
generating a third target value for the combustion parameter based on the first target value and the scaled value; and
controlling at least one engine actuator associated with the combustion parameter based on the third target value.

12. The method of claim 11 further comprising generating the first and second target values, respectively, based on an engine speed, an engine load, and an engine temperature.

13. The method of claim 11 further comprising:
determining a difference between the first target value and the second target value; and
setting the scaled value equal to a product of the difference and the scalar value.

14. The method of claim 13 further comprising setting the difference equal to the first target value minus the second target value.

15. The method of claim 11 further comprising setting the third target value equal to the first target value minus the scaled value.

16. The method of claim 11 further comprising generating the scalar value based on the predetermined value of the combustion stability.

17. The method of claim 16 further comprising generating the scalar value further based on an engine speed and an engine load.

18. The method of claim 16 further comprising generating the scalar value further based on a learned scalar value.

19. The method of claim 18 further comprising:
selectively initializing the learned scalar value to a predetermined value; and
selectively adjusting the learned scalar value during engine operation based on an engine speed, an engine load, an engine temperature, and the combustions stability.

20. The method of claim 19 further comprising:
generating a scalar limit value based on the engine speed, the engine load, and the engine temperature; and
limiting the learned scalar value to the scalar limit value.

* * * * *